(12) United States Patent
Elsharif et al.

(10) Patent No.: US 12,743,379 B2
(45) Date of Patent: Sep. 22, 2026

(54) INTERLEAVING CACHE LINE DATA TRANSFERS AND HANDLING MISSES OF SPECULATIVELY FETCHED DATA

(71) Applicant: INTERNATIONAL BUSINESS MACHINES CORPORATION, Armonk, NY (US)

(72) Inventors: Ashraf Elsharif, Austin, TX (US); Jason D Kohl, Austin, TX (US); Chunggeon Rhee, Poughkeepsie, NY (US); Keerthana Jetty, Austin, TX (US); Christine Nienhuis, Austin, TX (US); Hieu Trong Huynh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/928,662

(22) Filed: Oct. 28, 2024

(65) Prior Publication Data

US 2026/0119405 A1 Apr. 30, 2026

(51) Int. Cl.

*G06F 12/0864* (2016.01)
*G06F 12/0811* (2016.01)
*G06F 13/24* (2006.01)

(52) U.S. Cl.

CPC ...... *G06F 12/0864* (2013.01); *G06F 12/0811* (2013.01); *G06F 13/24* (2013.01)

(58) Field of Classification Search

CPC ... G06F 13/24; G06F 12/0864; G06F 12/0811
USPC .................................................. 711/118, 119
See application file for complete search history.

(56) References Cited

U.S. PATENT DOCUMENTS 5,537,635 A 7/1996 Douglas
5,784,590 A * 7/1998 Cohen ................. G06F 12/0848 711/E12.043
6,119,202 A 9/2000 Borkenhagen et al.
8,301,865 B2 10/2012 Grohoski et al.
9,665,297 B1 5/2017 De La Torre et al.

(Continued)

FOREIGN PATENT DOCUMENTS

CN 107480071 A 12/2017
EP 0355320 A2 2/1990

OTHER PUBLICATIONS

Authors et. al.: Disclosed Without Attribution, "Method and Apparatus for Dynamic Cache Bypass and Insertion", An IP.com Prior Art Database Technical Disclosure, IP.com No. IPCOM000223644D, IP.com Electronic Publication Date: Nov. 20, 2012, 7 pages.

(Continued)

*Primary Examiner* — Hashem Farrokh
(74) *Attorney, Agent, or Firm* — Onyx IP Group

(57) ABSTRACT

Methods, apparatuses, and systems for interleaving cache line data transfers and handling misses of speculatively fetched data are disclosed, including receiving, by a first cache, one or more data requests from a requesting device; transferring, by the first cache in response to the one or more data requests, data of a first cache line to a second cache; interrupting the transfer of data of the first cache line by transferring a first portion of data of a second cache line to the second cache; and transferring, by the first cache, remaining data of the first cache line to the second cache.

20 Claims, 6 Drawing Sheets

(56) References Cited

U.S. PATENT DOCUMENTS

| | | | |
|---|---|---|---|
| 11,573,899 B1 | 2/2023 | Abali et al. | |
| 2009/0031088 A1* | 1/2009 | Donley | G06F 12/0862 711/147 |
| 2018/0081557 A1* | 3/2018 | Kasibhatla | G06F 3/0659 |
| 2018/0267913 A1 | 9/2018 | Rohleder et al. | |
| 2019/0095330 A1 | 3/2019 | Roberts et al. | |

OTHER PUBLICATIONS

Authors et al.: Disclosed Without Attribution, “Method for Hardware Pre-Fetching of the Structured Dat of Cache Miss Loads”, An IP.com Prior Art Database Technical Disclosure, IP.com No. IPCOM000127016D IP.com, Electronic Publication Date: Aug. 17, 2005, 8 pages.

Authors et al.: Disclosed Without Attribution, “System and Method for Software Debug Using Fast Cache Simulation By Separation of Data and Tag Views”, An IP.com Prior Art Database Technical Disclosure, IP.com No. IPCOM000267673D, IP.com Electronic Publication Date: Nov. 15, 2021, 18 pages.

Kubiatowicz, “3+1 Cs of Caching and many ways Cache Optimizations Memory Technology”, CS252 Graduate Computer Architecture—Lecture 15, Electrical Engineering and Computer Sciences University of California, Berkeley, 2009, 17 pages.

Mernik et al., “Reducing Energy and Delay Using Efficient Victim Caches”, ISLPED’03, Aug. 25-27, 2003, Seoul, Korea, 4 pages.

Mudge, “Improving Data Cache Performance by Pre-executing Instructions Under a Cache Miss”, Author Retrospective, ACM International Conference on Supercomputing 25th Anniversary vol. 2014, 2 pages, <http://dx. doi.org/10.1145/2591635.2591655>.

Tang, “Lecture 20: Multi-Cache Designs”, Fall 2023, 2023, 23 pages.

Alrababah et al., “Data Flows Management and Control in Computer”, International Journal of Advanced Computer Science and Applications, Sep. 20, 2018, 11 pages.

International Searching Authority, “Notification of Transmittal of the International Search Report and the Written Opinion of the International Searching Authority, or Declaration,” Patent Cooperation Treaty, Mar. 18, 2026, 7 pages, International Application No. PCT/IB2025/060288

* cited by examiner

INTERLEAVING CACHE LINE DATA TRANSFERS AND HANDLING MISSES OF SPECULATIVELY FETCHED DATA

BACKGROUND

The present disclosure relates to methods, apparatus, and products for interleaving cache line data transfers and handling misses of speculatively fetched data. A computing system typically includes one or more caches that are implemented using high speed memory devices to temporarily store values that might be repeatedly accessed by a processor, in order to increase performance by avoiding the longer step of loading the values from a main memory device. Increasing the speed at which data from the cache is made available to the processor will increase the performance of the computing system, resulting in faster and more efficient execution of applications and programs.

SUMMARY

According to embodiments of the present disclosure, various methods, apparatus and products for interleaving cache line data transfers and handling misses of speculatively fetched data are described herein. Embodiments in accordance with the present disclosure increase the performance of a computing system by interleaving data from different cache lines when sending data to the data bus. For example, after sending a beginning portion of a first cache line to a requestor, a cache controller interrupts the first cache line by sending a beginning portion of a second cache line while delaying the later portion of the first cache line. In this way, data from the second cache line will reach the requestor sooner so that a core can begin using the data. Embodiments in accordance with the present disclosure also increase the performance of a computing system by reclaiming bus bandwidth (e.g., data transfer cycles) to be used for speculative data transfers when those speculations are a cache line miss. For example, when a speculative cache line transfer is interleaved with a preceding cache line transfer, the speculative cache line transfer can be discontinued when the directory results indicate that the speculative cache line transfer is a miss. In this way, the data transfer cycles and power consumption penalties associated with cache misses can be reduced. The reclaimed cycles from the miss can be used for a new speculative hit fetch, and in this way the data bus is used more efficiently and can send more data on average.

In some aspects, interleaving cache line data transfers and handling misses of speculatively fetched data includes a method in which a first cache receives one or more data requests from a requesting device. The first cache transfers, in response to the one or more data requests, data of a first cache line to a second cache. The transfer of data of the first cache line is interrupted by transferring a first portion of data of a second cache line to the second cache. The first cache then transfers remaining data of the first cache line to the second cache.

DETAILED DESCRIPTION

Figure 1:
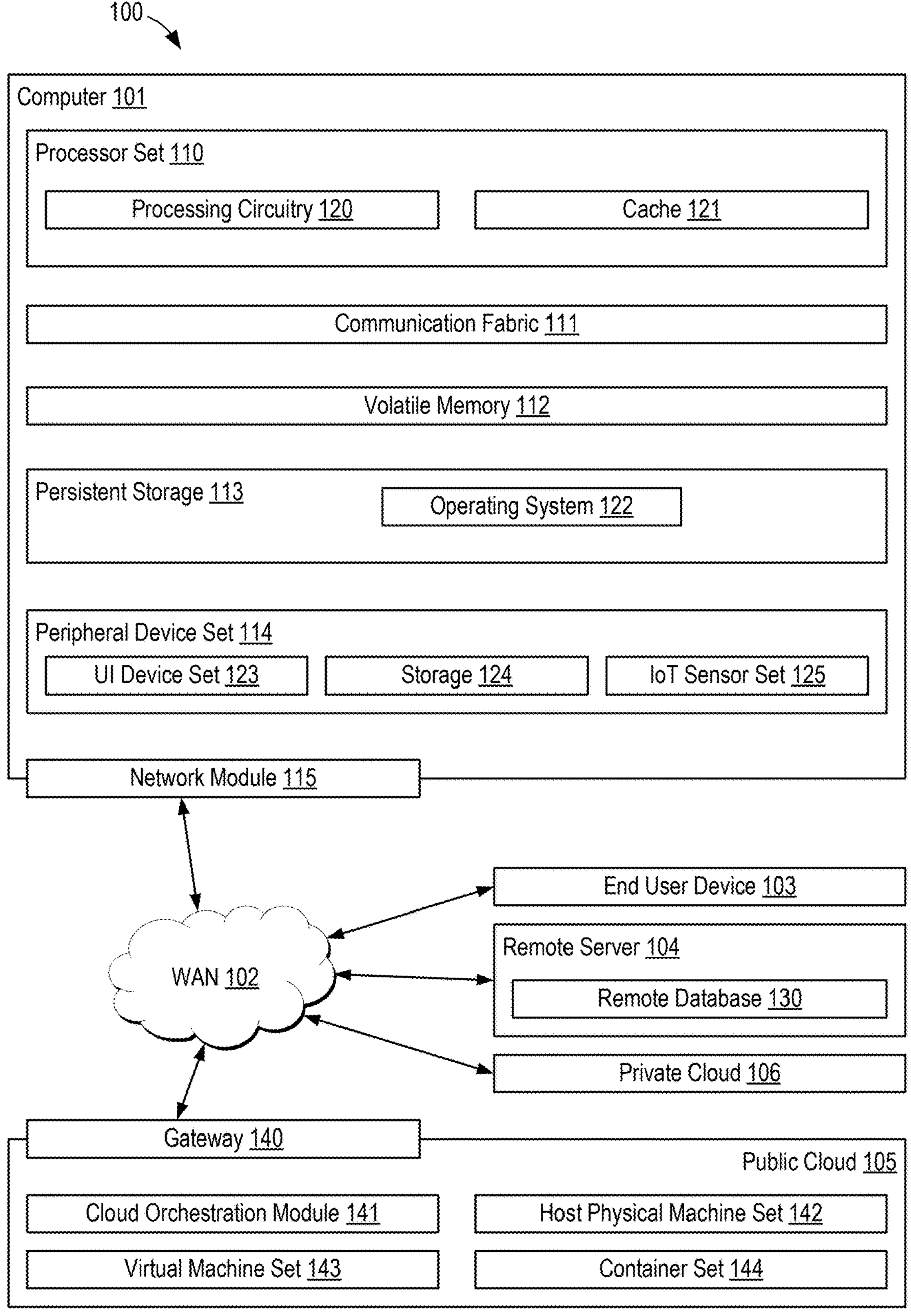
FIG. 1 sets forth a block diagram of an example computing environment for interleaving cache line data transfers and handling misses of speculatively fetched data in accordance with at least one embodiment of the present disclosure.

A computing system typically includes one or more caches that are implemented using high speed memory devices to temporarily store values that might be repeatedly accessed by a processor, in order to increase performance by avoiding the longer step of loading the values from a main memory device. Caches are composed of cache lines having a width (i.e., data capacity) that is typically selected to be the width of one row of system memory. As such, each cache line is associated with a byte range of system memory. To expedite memory accesses, one row of system memory is loaded into a cache line. Memory access requests (reads and writes) can then be serviced from the cache without reading or writing data to system memory. If the cache line is no longer being used frequently, the cache line can be flushed, including any modifications, to system memory to make room in the cache for other data in accordance with an eviction policy.

Computing systems may include multiple caches that are described in the context of a cache hierarchy. The highest-level cache in the cache hierarchy is typically referred to as a level 1 (L1) cache. The L1 cache is private to the core and is typically the smallest cache in the cache hierarchy but also incurs the lowest access penalty (defined by the number of cycles to retrieve data from the cache). Moving down in the cache hierarchy, caches typically become progressively larger at each level and as a result incur greater access penalties. At these levels in the hierarchy, caches may be shared caches, such as a level 2 (L2) cache that is shared by multiple cores in a processor, a level 3 (L3) cache that is shared by multiple processors in a processor set, a level 4 (L4) cache that is shared by multiple processor sets in a node, and so on. When a core issues an access request (read or write) for a particular memory location in system memory, the access request is first processed by the L1 cache. If the data for the memory location is present in the L1 cache, then the access 'hits' the L1 cache and the data is loaded from the L1 cache. If the data for the memory location is not present in the cache, then the access 'misses' the L1 cache. It is then determined if the data for the memory location is present in the next level cache, thus either hitting or missing that cache, and so on. If the data for the memory location is not present in any level of the cache hierarchy, the data is loaded from system memory.

To determine whether or not data for a particular memory location is present in a cache, a cache controller consults a cache directory using information from a received access request. The cache controller includes hardware logic that manages cache memory, providing an interface among cores, caches, and system memory. The cache directory is a repository of information regarding cache lines in the cache. The cache directory records, for each cache line, the identity of the cache line or cache line 'address tag' as well as the cache line state, such as 'modified,' 'invalid,' and so on. The address tag is a subset of the full address of the corresponding memory block. To determine whether data for a particular memory address is present in the cache, a portion of the memory address is compared to address tags in the tag directory. For example, if an access request misses the L1 cache, the L1 cache may issue a fetch request to the L2 cache. The L2 cache consults the cache directory to determine whether the data is present in the L2 cache based on the memory address and the address tags in the directory, and provides the data to the L1 cache when there is a cache hit. In some examples, the cores and the cache controller consult and update the information in the cache directory with every cache operation.

In some implementations, caches are logically partitioned into sets of cache lines and a given memory block is associated with a particular set. Each memory address in system memory maps to a specific set, and can be mapped to any one of the cache lines in the set. An N-way set associative cache provides N cache lines in the set where data for memory locations mapping to that set might be found. For example, a 2-way set associative cache means that for any given system memory block there are two cache lines in the cache that the memory block can be mapped into; however, several different memory blocks are mapped to any given set. A 1-way set associative cache is direct mapped, that is, there is only one cache line that can contain a particular memory block. A cache is said to be fully associative if a memory block can occupy any cache lines, i.e., there is one set, and the address tag is the full address of the memory block. In other words, in an N-way associative cache a particular memory location is direct mapped to a single set of cache lines and data for the memory location may be stored at any one of N cache lines each representing a 'way' in which the memory location is associated with the set.

In some implementations, to boost performance, a cache controller will speculatively fetch all of the ways associated with a memory access request before the directory results are returned. In such implementations, it is assumed that the request will hit the cache, although it is not known which cache line the request will hit on until the directory results are returned. Consider an example of a 2-way set associative cache that is an L2 cache. The L2 cache receives a fetch request from the L1 cache for a particular memory location identified by an access request because the access request missed the L1 cache. The memory location is mapped to a distinct set in the L2 cache according to a preset mapping. As the cache is 2-way set associative, there are two cache lines (cache line A and cache line B) in the set that can contain data for the memory location. In response to the fetch request, the cache controller queries the directory with the address of the memory location. While waiting for the directory results to indicate the cache line that includes data for the memory location, or otherwise indicate a miss, the cache controller speculatively responds to the fetch request by fetching and sending data from both cache line A and cache line B.

In some implementations, the cache architecture is such that a cache controller retrieves data from the cache array through a cache array bus that includes a pipeline of latches and outputs that data to a data bus that can be read by the requestor. Thus, a segment of data at the end of the cache line takes longer to retrieve than a segment of data at the beginning of the cache line. This is because the data segment at front of the cache line is latched by the first latch in the pipeline. The first latch is coupled to the data bus, so the data segment at the front of the cache can be latched in one clock cycle and then output to the data bus. The data segment at the end of the cache line, however, must traverse a series of latches leading to the first latch. Propagation of the data from one latch to the next in the cache array bus requires one clock cycle. Thus, it requires several clock cycles (depending on the number of latches in the pipeline) for the data segment at the end of the cache line to reach the data bus.

Embodiments in accordance with the present disclosure increase the performance of a computing system by interleaving data from different cache lines when sending data to the data bus. For example, after sending a beginning portion of a first cache line to a requestor, a cache controller interrupts the first cache line by sending a beginning portion of a second cache line while waiting for a later portion of the first cache line to be ready at the data bus. In this way, the cache controller can send more data in the same amount of clock cycles that it takes to send one cache line to the requestor. Further, in this way, data from the second cache line will reach the requestor sooner so that a core can begin using the data. Embodiments in accordance with the present disclosure also increase the performance of a computing system by reclaiming bus bandwidth to be used for speculative data transfers when those speculations are a cache line miss. For example, when a speculative cache line transfer is interleaved with a preceding cache line transfer, the speculative cache line transfer can be discontinued when the directory results indicate that the speculative cache line transfer is a miss. In this way, the data transfer cycles and power consumption penalties associated with cache misses can be reduced.

FIG. 1 sets forth an example computing environment according to aspects of the present disclosure. Computing environment 100 contains an example of an environment for interleaving cache line data transfers and handling misses of speculatively fetched data. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101. These computer readable program instructions are stored in various types of computer readable storage media, such as cache 121 and the other storage media discussed below. The program instructions, and associated data, are accessed by processor set 110 to control and direct performance of computer programs that may be stored in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
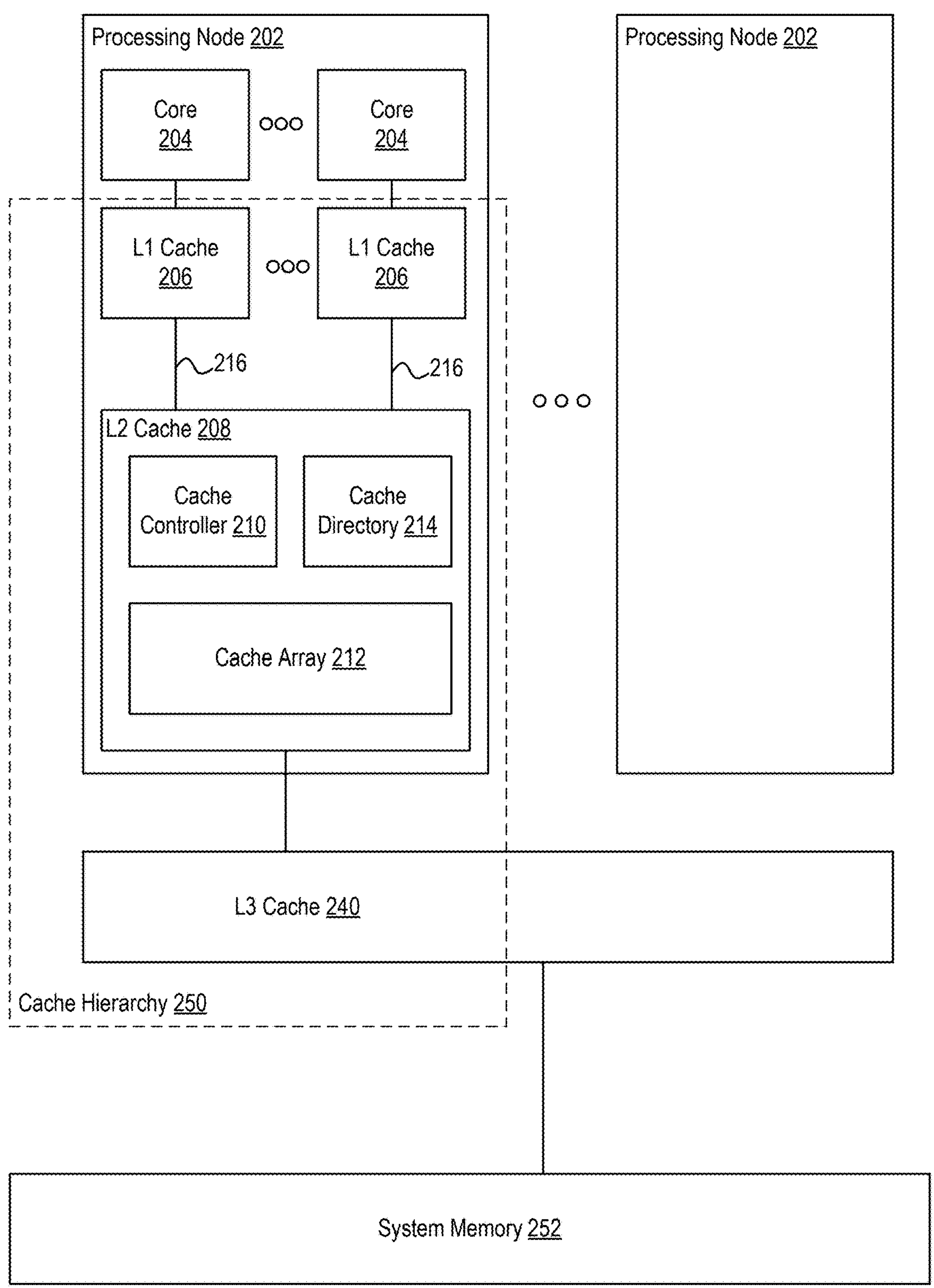
FIG. 2 sets forth a block diagram of an example system for interleaving cache line data transfers and handling misses of speculatively fetched data in accordance with at least one embodiment of the present disclosure.

For further explanation, FIG. 2 sets forth a block diagram of an example system for interleaving cache line data transfers and handling misses of speculatively fetched data in accordance with at least one embodiment of the present disclosure. The system 200 includes a processing node 202 coupled to a system memory 252 through a cache hierarchy 250. The processing node 202 includes multiple processing cores 204 (e.g., the processing circuitry 120 of FIG. 1). The cache hierarchy 250 includes an L1 cache 206 coupled to each processor core 204 as a private cache. The cache hierarchy 250 also includes a cache 208 (e.g., the cache 121 of FIG. 1) that is shared by the processor cores 204. The cache 208 may be an L2 cache that supplies data to the L1 caches 206. In some examples, the cache hierarchy 250 includes an L3 cache 240 that is shared by multiple processing nodes. Embodiments in accordance with the present disclosure are discussed in the context of operations within cache 208. Although cache 208 is discussed as an L2 cache, it will be appreciated that the principles of the present disclosure can be applied to any cache that provides data to a higher-level cache. For example, principles in accordance with the present disclosure may be applied to the L3 cache 240 that supplies data to the L2 cache 208.

The system includes a cache controller 210 that controls the cache 208. In some examples, the cache controller 210 is a component of the cache 208; although, in other examples, the cache controller 210 may be separate from the cache 208, such as a global cache controller. The cache controller 210 includes logic circuitry to manage cache memory in the form of a cache array 212. In some examples, the cache controller 210 is implemented by an application-specific integrated circuit (ASIC), microcontroller, or other specialized circuitry adapted for managing cache memory. The cache array 212 is a fast memory structure in that data can be loaded from the cache array 212 faster than it can be loaded from system memory 252. The cache array 212 is composed of cache lines that are each associated with an address tag that corresponds to a location in system memory 252. The cache controller 210 is configured to receive a data request such as a load request or fetch request from a requesting device such as a higher-level cache (e.g., L1 cache 206 in the example of FIG. 2) and cause the data to be transferred from the cache array 212 to a data bus 216 coupling the cache 208 to the L1 cache 206 if the requested data is present in the cache 208. If the requested data is present in a cache line, the data request hits on the cache line. If the requested data is not in any cache line of the cache 208, the data request misses the cache 208. The data request is associated with a memory location having a memory address. In some implementations, a first group of bits in the memory address corresponds to an address tag that can be used to identify a block of system memory. In a set associative cache, a second group of bits in the memory address identifies a set address corresponding to a set of cache lines in the cache. A third group of bits in the memory address corresponds to an offset in the block of system memory 252, and thus an offset in the cache line.

The system includes a cache directory 214 that includes information about memory locations for which data is stored in the cache array 212. The directory 214 maps address tags to cache lines, such that a query of the directory 214 using an address tag derived from a memory address in system memory 252 will yield a particular cache line that stores data for that memory address, if such data is present in the cache. The cache directory 214 can include a memory array structure that stores address tags, state bits, and other information about cache lines. The cache directory 214 can also include one or more comparators that compare address tags and/or set addresses in a query with address tags and/or set addresses in the memory array structure of the directory 214.

In accordance with the present disclosure, the cache controller 210 interleaves data of two or more cache lines when transferring data from those cache lines to a requesting device. In the example of FIG. 2, the requesting device may be an L1 cache 206. Cache controller 210 interleaves cache data by interrupting the transfer of units of a first cache line with a unit of a second cache line. The transfer of the first cache line is then completed by the cache controller 210 without further interruption, and subsequently the remainder of the second cache line is completed. The second cache line can also be interrupted by a unit of a third cache line. In this way, an initial portion of each cache line arrives at the requesting device earlier than if the cache lines were transferred serially, thus allowing the core 204 to begin utilizing the cache data.

In accordance with the present disclosure, assuming that the second cache line is a speculative fetch, the cache controller 210 reclaims data bus transfer cycles for a speculative cache line fetch by discontinuing the fetch of the remainder of second cache line when the directory results indicate that the second cache line is a miss. That is, the second cache line may be one of two or more cache lines that are associated with the address tag of a fetch request. The second cache line is speculatively scheduled for transfer while the directory lookup of the address tag processes and while the remainder of the first cache line is transferred. If the directory lookup results indicate that the speculatively-fetched second cache line is a miss, approximately when the transfer of the first cache line completes, no further units of the second cache line are transferred. The cache controller can then begin the transfer of a next cache line earlier than if the transfer of the speculatively-fetched second cache line was completed.

For the purpose of illustration, consider that an example implementation of the cache architecture is one in which a cache line in the cache array 212 is 256-bytes wide. Each cache line includes a plurality of data values that are associated with an address tag. The address tag indicates the memory location from which the data values in the cache line have been retrieved. The data values are fetched from the cache array 212 in units equal to a quarter line (QL) that is 64-bytes. In the cache array bus, data values are read from the cache array 212 and latched by the cache array bus in sub-units equal to an octword (OW) that is 32-bytes. The directory 214 includes the address tag for each cache line, thus indicating whether or not data for a particular memory location is present in the cache array 212.

Using this example implementation, consider that the cache controller 210 fetches cache line A, cache line B, and cache line C in response to one or more fetch requests from an L1 cache 206. Cache line A will be transferred as quarter lines A0, A1, A2, and A3. Cache line B will be transferred as quarter lines B0, B1, B2, and B3. Cache line C will be transferred as quarter lines C0, C1, C2, and C3. The cache controller 210 transfers quarter lines A0 and A1 of cache line A, and then interrupts the transfer of cache line A by transferring the first quarter line B0 of cache line B. The cache controller 210 then completes the transfer of cache line A by transferring quarter lines A2 and A3. The cache controller 210 then resumes the transfer of cache line B by transferring quarter line B1. At this point, the cache controller can also interrupt the transfer of cache line B by transferring quarter line C0 of cache line C. Then cache controller 210 then completes the transfer of cache line B by transferring quarter lines B2 and B3. If there are no other pending fetches, the cache controller 210 then completes the transfer of cache line C by transferring quarter lines C1, C2, and C3. However, it will be appreciated that the transfer of cache line C could also be interrupted by a next cache line fetch. Thus, the sequence of the data transfer will be A0, A1, B0, A2, A3, B1, C0, B2, B3, C1, C2, C3. As previously discussed, quarter line B0 will be at the front of the cache array 212 and thus can be transferred to the data bus 216 faster than quarter lines A2 and A3. Likewise, quarter line C0 will be at the front of cache array 212 and thus can be transferred to the data bus 216 faster than quarter lines B2 and B3. In this way, data from multiple cache lines is interleaved using only the pipeline staging in the internal cache array bus. The data interleaving allows portions of data from each pending cache line transfer to reach the core 204 faster so that the core 204 can begin utilizing cache line data earlier than if the data were transferred serially. Further, the data interleaving increases the efficiency of data transfer from the cache 208 because data is transferred during cycles when the cache controller 210 would otherwise be waiting for cache data to be pipelined to the data bus 216.

Continuing the above example, consider that the cache 208 is a 2-way set associative cache. The cache controller 210 receives a fetch request that identifies a memory location. The memory location maps to a set S within the cache array and further maps to two 'ways' in set S, i.e., there are two cache lines in which data for the memory location could reside. The cache controller identifies that set S includes cache line A and cache line B. A directory lookup in directory 214 is initiated (e.g., by the cache controller 210) using an address tag taken from the memory address to determine whether the fetch request hits on cache line A or cache line B. While waiting for the directory results, the cache controller 210 begins the transfer of cache line A and cache line B. For the purpose of illustration, consider that there is also a cache line C that is scheduled to be fetched after cache line B, for example, in association with a different fetch request. As explained above, the cache controller 210 transfers quarter line A0 and A1 of cache line A and interrupts the transfer of cache line A by sending quarter line B0 of cache line B. The cache controller 210 then resumes the transfer of cache line A by sending quarter lines A2 and A3. In this example, assume that the directory lookup takes four data transfer cycles to complete. Thus, by the time quarter line A3 is available at the data bus 216, the directory results are available to the cache controller 210. If the directory results indicate that cache line B is a miss, the cache controller 210 terminates the transfer of cache line B by not transferring quarter lines B1, B2 and B3 and instead transfers cache line C. If the directory results indicate that cache line B is not a miss, the transfer of quarter lines B1, B2 and B3 proceeds as scheduled.

Figure 3:
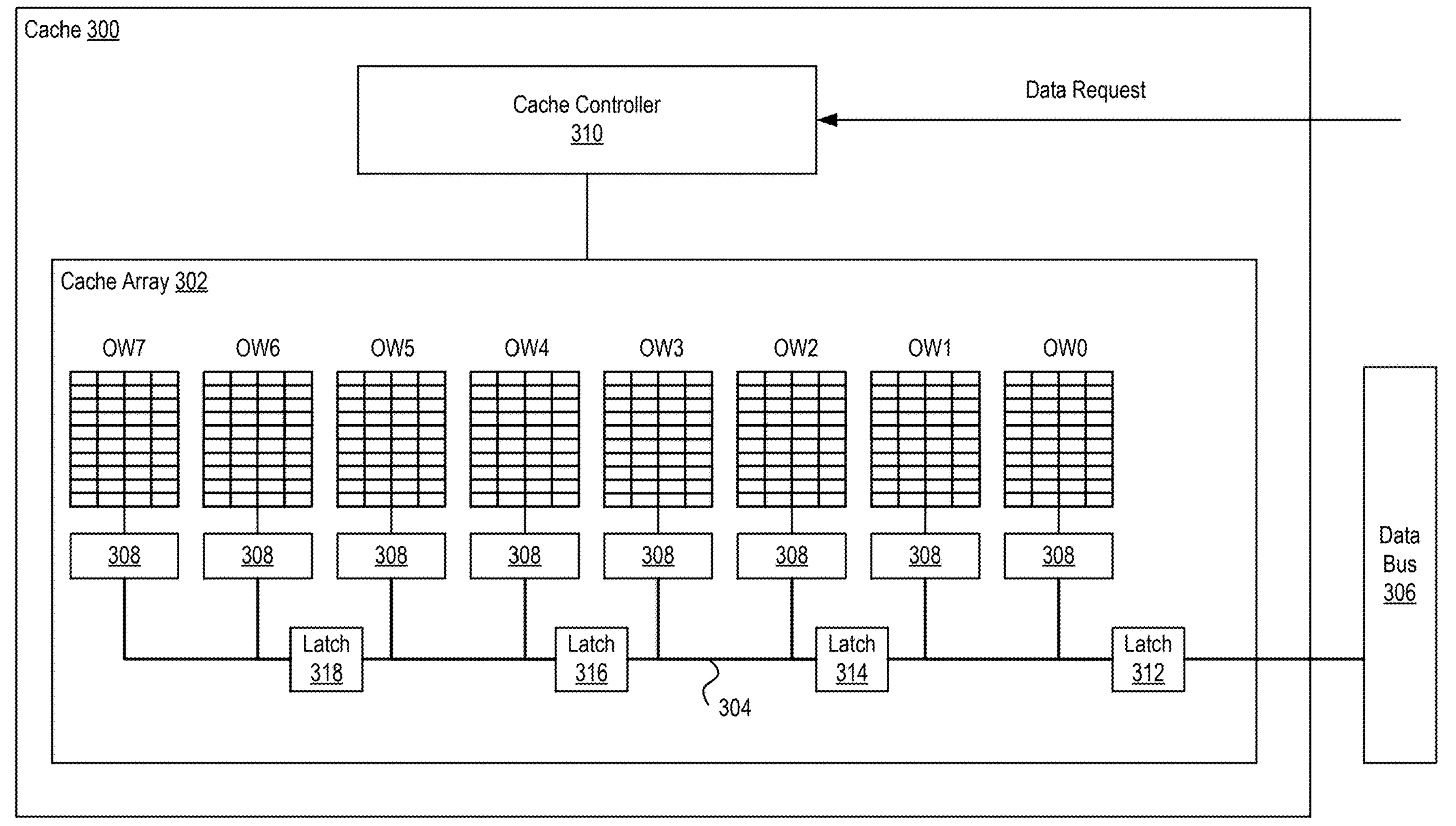
FIG. 3 sets forth a block diagram of an example cache architecture for interleaving cache line data transfers and handling misses of speculatively fetched data in accordance with at least one embodiment of the present disclosure.

For further explanation, FIG. 3 sets forth an example cache 300 for interleaving cache line data transfers and handling misses of speculatively fetched data in accordance with at least one embodiment of the present disclosure. In some implementations, the architecture of cache 300 is employed to implement cache 208 of FIG. 2. Cache 300 includes a cache array 302. Logically, a row of the cache array can be divided into column units having a width that is equal to the width of the cache array bus 304 that delivers data from the cache array 302 to the data bus 306. For example, where a cache line is 256-bytes and the cache array bus is 32-bytes wide, a cache line may be composed of column units that includes eight 32-byte octwords. Thus, when delivering a cache line to the data bus 306, the cache array 302 outputs one octword of the cache line at a time. The cache array 302 includes gate logic 308 for each column unit of the cache array. In the example of FIG. 3, there is gate logic 308 for each octword OW0, OW1, OW2, OW3, OW4, OW5, OW6, OW7 of the cache array 302. The gate logic 308 is controlled by cache controller 310.

The gate logic 308 determines when data (e.g., octwords of data) from the cache array 302 is presented in the cache array bus 304. The cache array bus 304 includes a pipeline of latches 312, 314, 316, 318. In the example of FIG. 3 there is one latch for every two column units, however the number of latches along the cache array bus 304 may be selected based on implementation requirements. It can be seen in FIG. 3 that OW0 and OW1 are closer to the data bus 306 than OW6 and OW7. Further, it can be seen that data from OW0 and OW1 only passes through latch 312 before arriving at the data bus 306, while data from OW7 and OW7 must pass through all of the latches 312, 314, 316, 318. Thus, data at the end of the cache line takes longer to arrive at the data bus 306 than data at the beginning of the cache line. Typically, the cache array 302 would be idle while waiting for data at the end of the cache line to arrive at the data bus 306.

In accordance with the present disclosure, interleaving data from multiple cache lines reduces the amount of time that the cache array is idle when carrying out back to back fetches of data. While waiting for remaining data of one cache line to reach the data bus 306, data from the beginning of another cache line can be output to the cache array bus 304. For example, while data from OW4 of cache line A is latched by latch 316, data from OW0 of cache line B can be latched by latch 312. The data from OW0 of cache line B will be output to the data bus 306 before the data from OW4 of cache line A reaches latch 312; thus, there is no risk of overwriting the data from cache line B. In this way, data from cache line B will reach the core sooner than if the cache lines were transferred serially, and the cache array 302 is idle for fewer cycles. The interleaving of cache line data is accomplished by staging the output to the data bus 306 without the need for buffering cache lines before interleaving their data.

For purposes of illustration, consider an example where fetches of cache line A, cache line B, and cache line C are received back-to-back. Cache line A is composed of octwords a0-a7 and cache line B is composed of octwords b0-b7. An example sequence is as follows: a0 goes into latch 312; a1 goes into latch 312 and a0 goes to data bus 306; a2 goes into latch 314 and a1 goes to data bus 306; a3 goes into latch 314 and a2 goes to data bus 306 while b0 is fetched. Subsequently, b0 goes into latch 312 while a4 goes into latch 316; b0 goes to data bus 306 and b1 goes to latch 312 while a4 goes to latch 314 and a5 goes to latch 316; b1 goes to data bus 306, a5 goes to latch 314, a4 goes to latch 312, and a6 goes to latch 318; a6 goes to latch 316, a5 goes to latch 312, a4 goes to data bus 306 while a7 is latched by latch 318. Subsequently, a5, a6, and a7 progress through the cache array bus 304 until they reach data bus 306; meanwhile, b2-b7 have been fetched from the cache array and are ready to read onto the cache array bus. However, if cache line B is a miss, the cache controller 310 utilizes the gate logic 308 to prevent b2-b7 of cache line B from reading onto the cache array bus 304. Instead, the first octword c0 of cache line C will be read onto the cache array bus 304.

Figure 4:
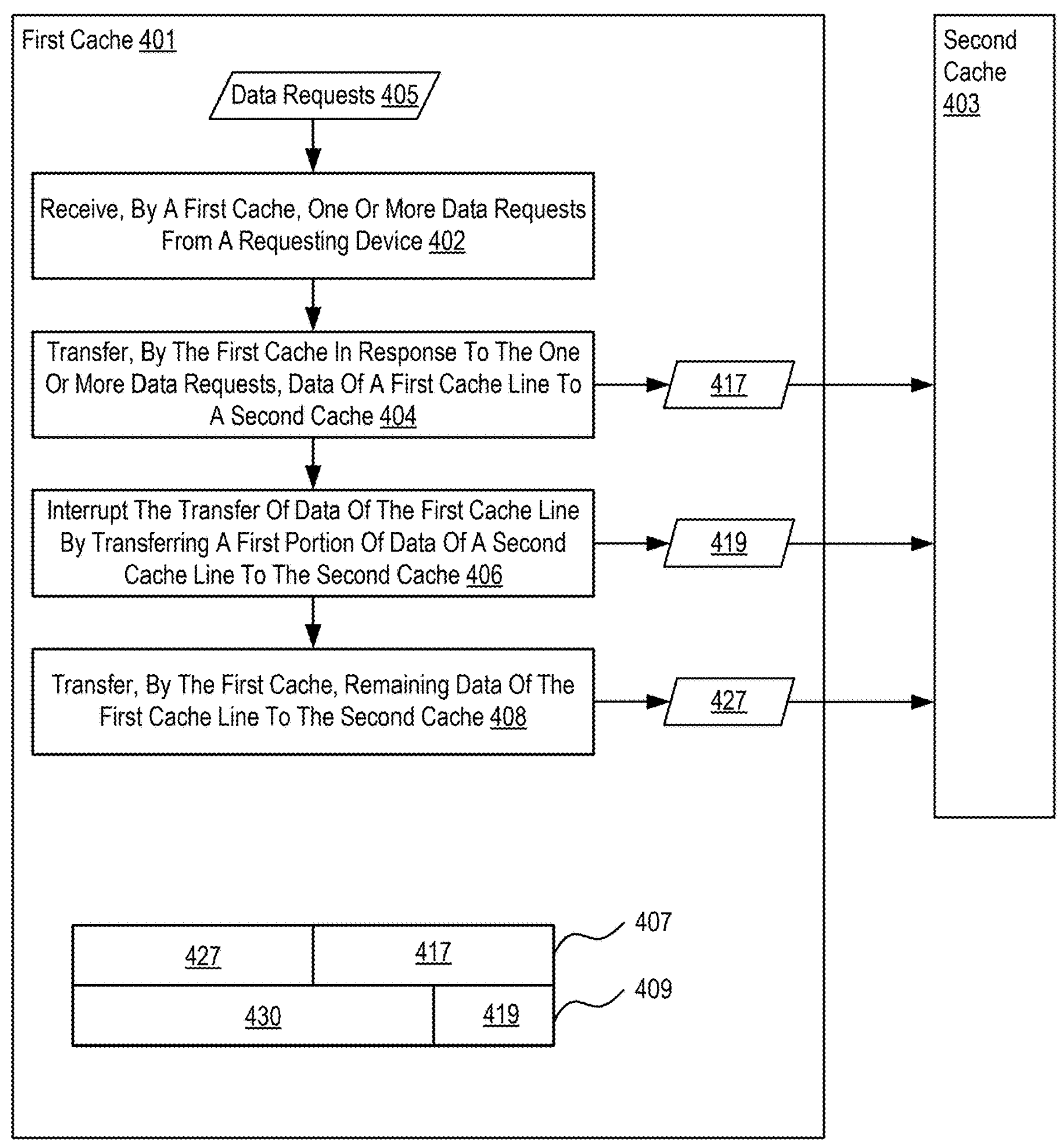
FIG. 4 sets forth a flow chart of an example method for interleaving cache line data transfers and handling misses of speculatively fetched data in accordance with at least one embodiment of the present disclosure.

For further explanation, FIG. 4 sets forth a flow chart of an example method for interleaving cache line data transfers and handling misses of speculatively fetched data in accordance with at least one embodiment of the present disclosure. The example of FIG. 4 includes a first cache 401 and a second cache 403. The second cache 403 is a higher-level cache than the first cache 401. For example, the first cache 401 can be an L2 cache and the second cache can be an L1 cache. As another example, the first cache can be an L3 cache and the second cache can be an L2 cache. For ease of explanation and not limitation, the following examples may refer to the first cache 401 as an L2 cache and the second cache 403 as an L1 cache. It will be appreciated that the first cache 401 and the second cache 403 are part of a cache hierarchy that interposes one or more processor cores and system memory. As such, for a given instruction targeting a location in system memory, it may first be determined whether data for that memory location is present in any cache in the cache hierarchy. An instruction will hit on a cache if the targeted data is included in one its cache lines. If the targeted data is not present in a cache line of a cache and thus misses the cache, that cache can be filled with a cache line from a lower-level cache or the data can be requested by the core from the lower-level cache. The request by one cache for a cache line of data from another cache, or the request by a core for data from a cache, is referred to herein interchangeably as a 'data transfer request' or 'fetch request,' or simply as a 'data request.'

The method of FIG. 4 includes receiving 402, by the first cache 401, one or more data requests 405 from a requesting device. In some examples, the first cache 401 receives 402 the one or more data requests 405 by receiving a fetch request from the second cache 403. For example, a data request may be received from an L1 cache by an L2 cache when data requested by the core misses the L1 cache. The core issues an instruction that targets a memory location by specifying a memory address. When the data for that memory location is not in the L1 cache, all or part of the memory address is provided in a call from the L1 cache to the L2 cache. In one example, the data request received by the first cache identifies an address tag for the memory location. In another example, data request identifies a set address and an address tag. In some implementations, the data request is received by a cache controller. In various implementations, the cache controller may be part of the first cache 401 or separate from the first cache 401, and may be dedicated to the first cache 401 or a cache controller for multiple levels of the cache hierarchy.

To improve the performance and efficiency of data transfer between the first cache and the second cache, and thus the performance of the processor cores, cache line data is interleaved during transfer. As such, the method of FIG. 4 also includes transferring 404, by the first cache 401 in response to the one or more data requests 405, data of a first cache line 407 to the second cache 403. In some example, the first cache 401 transfers 404 data of a first cache line 407 to the second cache 403 by reading data out of the cache array of the first cache 401 and transferring at least a portion 417 of the data to the second cache 403. For example, the portion 417 of data can be the first quarter line of cache line 407 or the first two quarter lines of cache line 407, or some other unit that is less than the entire cache line. The portion 417 of data is transferred via a data bus coupling the first cache 401 and the second cache 403.

The method of FIG. 4 also includes interrupting 406 the transfer of data of the first cache line 407 by transferring a first portion 419 of data of a second cache line 409 to the second cache 403. In some examples, the first cache 401 interrupts 406 the transfer of the first cache line 407 after sending only the portion 417 of the first cache line by sending a first portion 419 of the second cache line 409. For example, the first portion 419 of the second cache line 409 can be the first quarter line of cache line 409. After transmitting only the first portion 419, the first cache 401 suspends sending any more data from the second cache line 409.

The method of FIG. 4 also includes transferring 408, by the first cache 401, remaining data 427 of the first cache line 407 to the second cache. In some examples, the first cache 401 transfers 408 the remaining data 427 of the first cache line 407 by resuming the transfer of data from the first cache line 407 and completing the transfer of the entire cache line 407 to the second cache 403. It will be appreciated that remaining data 427 is physically farther from the data bus than the first portion 419 of the second cache line 409. Thus, the first portion 419 of the second cache line 409 can be transferred while the remaining data 427 of the first cache line 407 is being staged for transfer. That is, the remaining data 427, being physically farther from the data bus, takes more time to be ready out of the cache array and onto the data bus. As the remaining data 427 progresses through the cache pipeline, data that is physically closer to the data bus can be read out ahead of the data physically farther from the data bus.

In this way, data at the beginning of the cache line (physically closer to the data bus) can be made available earlier, via interleaving the data from multiple cache lines, than it would be available if the data were transmitted serially. This allows the core to begin utilizing that data earlier. Further, interleaving the data from multiple cache arrays utilizes portions of the cache array for reading data that otherwise would have been idle while waiting for data physically farther from the data bus to ready for transfer. In some implementations, the transfer of a cache line can only be interrupted once to avoid holding the core in a state where it is waiting for the remaining data of the cache line.

Once the remaining data 427 of the first cache line 407 is transferred, the remaining data 430 of the second cache line 409 can be subsequently transferred. However, the second cache line 409 can also be interrupted. For further explanation, FIG. 5 sets forth another example method of interleaving cache line data transfers and handling misses of speculatively fetched data in accordance with at least one embodiment of the present disclosure. The method of FIG. 5 includes transferring 502, by the first cache 401 to the second cache 403, a second portion 529 of data of the second cache line 409. In some examples, after the transfer of the entire first cache line 407 has completed, the first cache 401 resumes transferring the second cache line 409 and transfers 502 a second portion 529 of data by transferring, for example, another quarter line (or other unit of data that is less the remaining data) of the second cache line 409.

Figure 5:
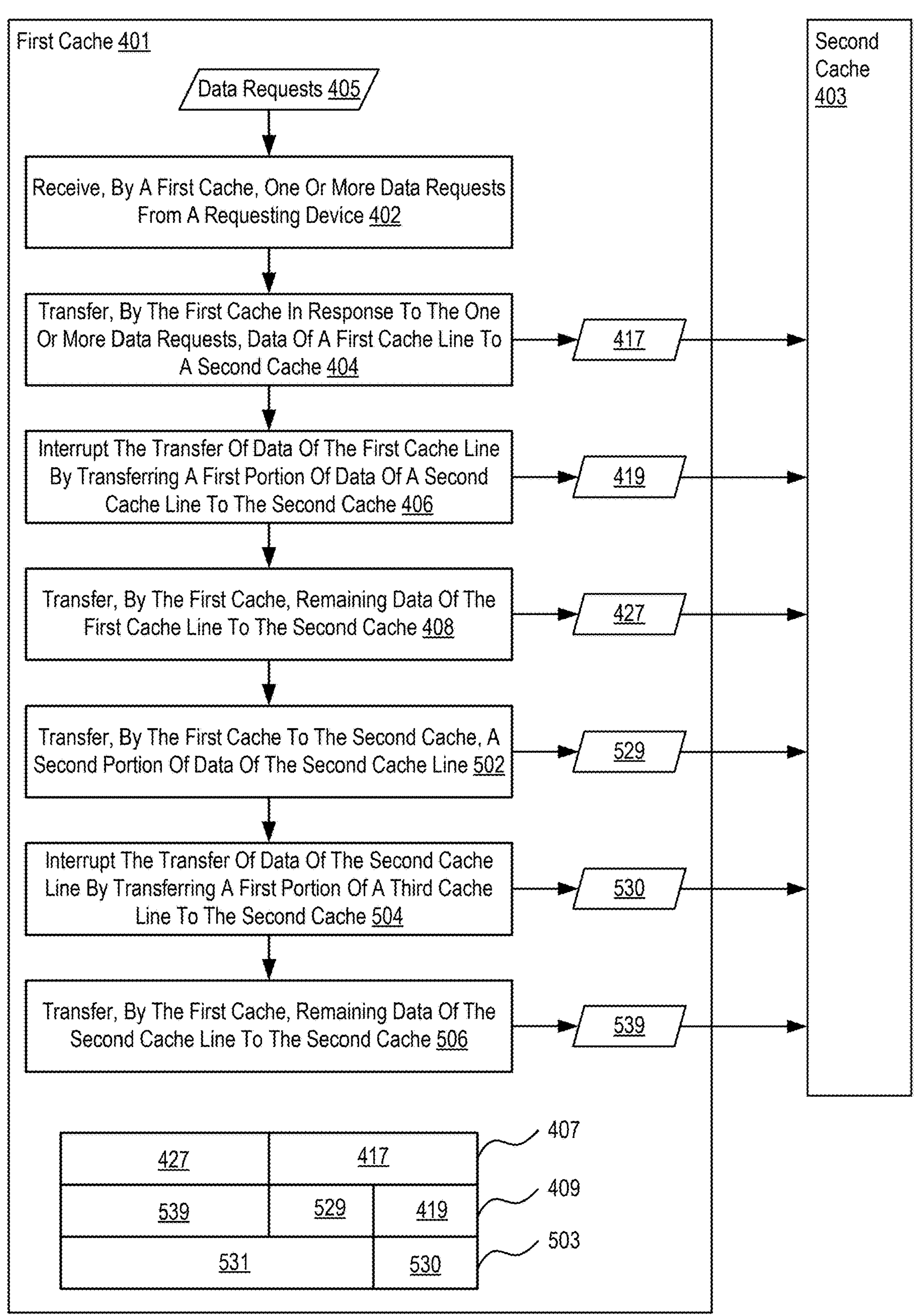
FIG. 5 sets forth a flow chart of an example method for interleaving cache line data transfers and handling misses of speculatively fetched data in accordance with at least one embodiment of the present disclosure.

The method of FIG. 5 also includes interrupting 504 the transfer of data of the second cache line 409 by transferring a first portion 530 of a third cache line 503 to the second cache 403. In some examples, the first cache 401 interrupts 504 the transfer of data of the second cache line 409 by sending the first quarter line of the third cache line 503. In some implementations, the transfer of a cache line cannot be interrupted by more than a predefined number of data cycles. For example, the predefined number of data cycles may be the number of cycles it takes to send one quarter line of cache data.

The method of FIG. 5 also includes transferring 506, by the first cache 401, remaining data 539 of the second cache line 409 to the second cache 403. In some examples, the first cache 401 transfers 506 the remaining data 539 of the second cache line 409 by resuming the transfer of data from the second cache line 409 and completing the transfer of the entire cache line 409 to the second cache 403. It will be appreciated that remaining data 539 is physically farther from the data bus than the first portion 530 of the third cache line 503. Thus, the first portion 530 of the third cache line 503 can be transferred while the remaining data 539 of the second cache line 409 is being staged for transfer.

In some scenarios, a cache line may be speculatively transferred from the first cache based on set association or some other predictive mechanism. For example, the second cache line might be predicted to follow the first cache line based on machine learning or some other predictive model. As another example, multiple ways of a set in a set associative cache may be transferred. It is not known whether the predicted cache line will be an actual hit for a data request until the results of a lookup in a cache directory are known. However, speculatively reading and transferring these cache lines may boost execution performance even though they consume more energy to perform. To mitigate the energy efficiency of such speculation, cache line data interleaving is used assist in reclaiming data transfer resources when a speculative hit is actually a miss.

Figure 6:
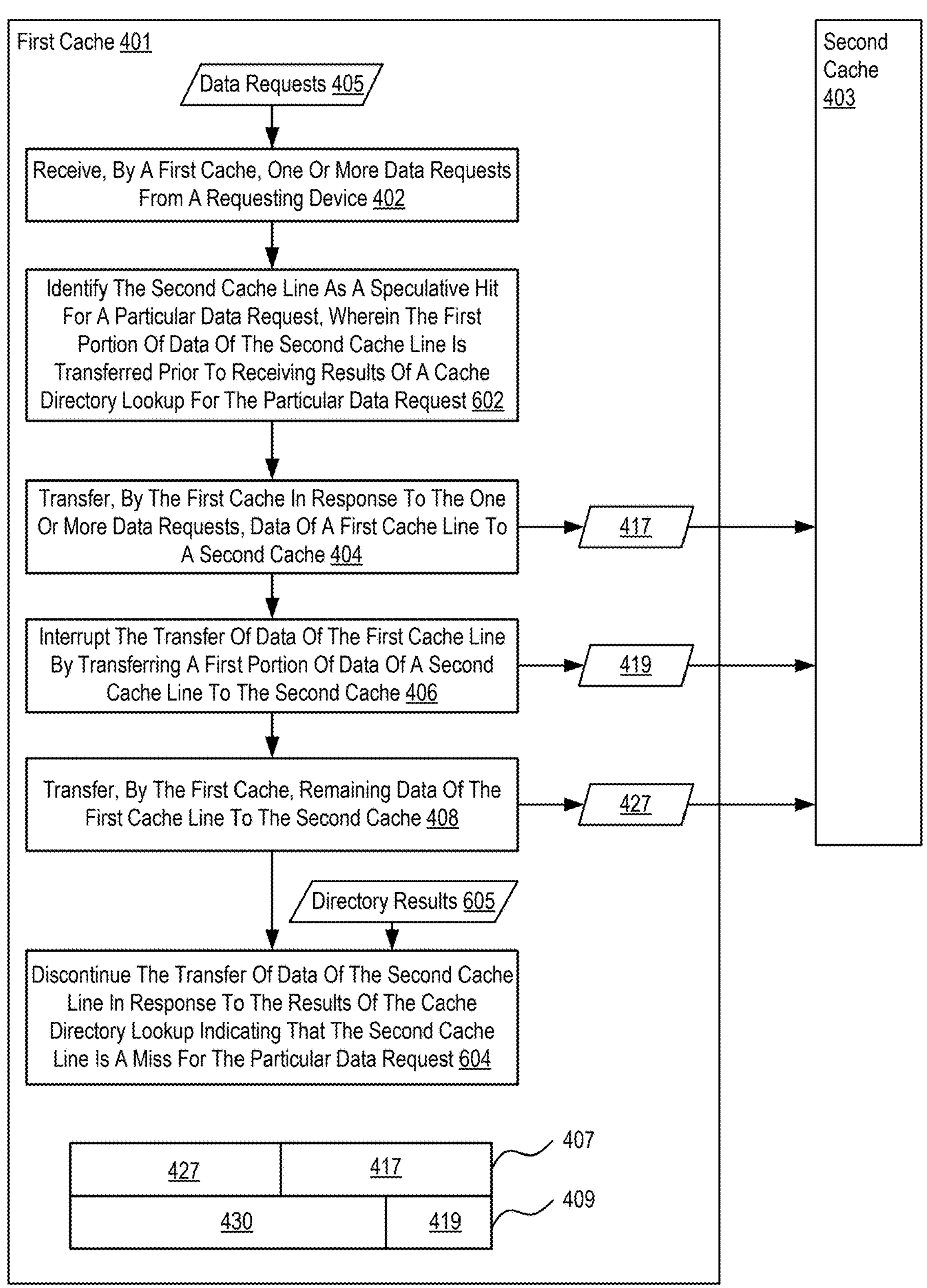
FIG. 6 sets forth a flow chart of an example method for interleaving cache line data transfers and handling misses of speculatively fetched data in accordance with at least one embodiment of the present disclosure.

For further explanation, FIG. 6 sets forth a flow chart of another example method of interleaving cache line data transfers and handling misses of speculatively fetched data in accordance with at least one embodiment of the present disclosure. The method of FIG. 6 includes identifying 602 the second cache line 409 as a speculative hit for a particular data request, wherein the first portion 419 of data of the second cache line 409 is transferred prior to receiving results of a cache directory lookup for the particular data request. In some examples, the cache controller of the first cache 401 identifies the second cache line 409 as a speculative hit by predicting that the particular data request will hit on the second cache line 409 based on information about the data request or other data requests. In a particular example, the first cache 401 is a set associative cache and the cache controller receives information indicating at least a set address and an address tag for the data request. In this example, the memory location targeted by the data request maps to a particular set based on the set address. The cache controller identifies the second cache line 409 as a member of this set and schedules the second cache line 409 for transfer to the second cache 403. The set address and address tag are also used for a director look up. In some implementations, the cache controller requests a directory lookup of the set address and address tag substantially contemporaneous with scheduling the second cache line 409 for transfer.

In a particular implementation, the directory compares the set address to a row in the directory, and then compares the address tag to all address tags in that row. If the address tag of the data request matches an address tag in the set, the directory returns the second cache line as a hit. Otherwise, the second cache line is a miss for the requested data. However, because the directory results take a number of data cycles to perform the comparisons, the first portion 419 of the second cache line 409 is transferred to the second cache 403 before the cache controller receives the results of the directory lookup.

In some examples, the first cache line and the second cache line are both speculatively transferred. For example, the first cache line and the second cache line may be different ways in the same set corresponding the memory location targeted by the data request.

The method of FIG. 6 also includes discontinuing 604 the transfer of data of the second cache line in response to the results 605 of the cache directory lookup indicating that the second cache line 409 is a miss for the particular data request. In some examples, the cache controller discontinues 604 the transfer of the second cache line 409 to the second cache 403 by preventing the cache array from outputting the remaining data 430 of the second cache line 409. For example, although the remaining data 430 may have been already read from the cache array, gate logic can be used to prevent the remaining data 430 from being output to the data bus by, for example, preventing the remaining data 430 from entering the cache pipeline for staging data transfers. In this way, the remaining data 430 is not transferred based on the particular data request, and transfer of a third cache line can proceed instead of the remaining data 531 of the third cache line. In this way, data of the third cache line is available to the core earlier than if the transfer of the second cache line 409 was completed, thus improving the execution performance of the core.

In view of the foregoing, an embodiment is directed to a method of interleaving cache line data transfers and handling misses of speculatively fetched data includes receiving, by a first cache, one or more data requests from a requesting device. The method also includes transferring, by the first cache in response to one or more data requests, data of a first cache line to a second cache. The method also includes interrupting the transfer of data of the first cache line by transferring a first portion of data of a second cache line to the second cache. The method also includes transferring, by the first cache, remaining data of the first cache line to the second cache. In some implementations, the first portion of the second cache line is transferred while the remaining data of the first cache line is staged for transfer. In some implementations, interleaving the data of the two or more cache lines includes interrupting a cache line transfer only once. In some variations, the remaining data of the second cache line is subsequently transferred. Thus, the embodiment increases the performance of a computing system by interleaving data from different cache lines when sending data to the data bus. In this way, data from the second cache line will reach the requestor sooner so that a core can begin using the data.

In some implementations, the method also includes transferring, by the first cache to the second cache, a second portion of data of the second cache line. The method also includes interrupting the transfer of data of the second cache line by transferring a first portion of a third cache line to the second cache. The method further includes transferring, by the first cache, remaining data of the second cache line to the second cache.

In some implementations, the method also includes identifying the second cache line as a speculative hit for a particular data request, where the first portion of data of the second cache line is transferred prior to receiving results of a cache directory lookup for the particular data request; and discontinuing the transfer of data of the second cache line in response to the results of the cache directory lookup indicating that the second cache line is a miss for the particular data request. In some implementations, data of a third cache line is transferred instead of remaining data of the second cache line when the second cache line is a miss. In some implementations, the first cache is a set associative cache, and the second cache line is identified as a speculative hit based on a set address associated with the particular data request. In this way, performance of a computing system is increased by reclaiming bus bandwidth (e.g., data transfer cycles) to be used for speculative data transfers when those speculations are a cache line miss. Further, the data transfer cycles and power consumption penalties associated with cache misses can be reduced. The reclaimed cycles from the miss are used for a new speculative hit fetch, and in this way the data bus is used more efficiently and can send more data on average.

In some implementations, the first cache line and the second cache line can both be speculative hits for the particular data request. In some aspects, the first cache is a level 2 (L2) cache and the second cache is a level one (L1) cache.

Another embodiment is directed to an apparatus that includes a first cache configured to output data from a cache array to a data bus and a cache controller configured to receive one or more data requests and control the first cache. The cache controller controls the cache to transfer, from the first cache in response to the one or more data requests, data of a first cache line to a second cache. The cache controller controls the cache to interrupt the transfer of data of the first cache line by transferring a first portion of data of a second cache line to the second cache. The cache controller then transfers, from the first cache to the second cache, remaining data of the first cache line. Thus, the embodiment increases the performance of a computing system by interleaving data from different cache lines when sending data to the data bus. In this way, data from the second cache line will reach the requestor sooner so that a core can begin using the data.

In some implementations, the apparatus further includes a cache directory describing contents of the first cache and the directory is configured to provide directory lookup results to the cache controller. The cache controller is configured to identify the second cache line as a speculative hit for a particular data request, where the first portion of data of the second cache line is transferred prior to receiving results of a cache directory lookup for the particular data request. The cache controller discontinues the transfer of data of the second cache line in response to the results of the cache directory lookup indicating that the second cache line is a miss for the particular data request. In this way, performance of a computing system is increased by reclaiming bus bandwidth (e.g., data transfer cycles) to be used for speculative data transfers when those speculations are a cache line miss. Further, the data transfer cycles and power consumption penalties associated with cache misses can be reduced. The reclaimed cycles from the miss are used for a new speculative hit fetch, and in this way the data bus is used more efficiently and can send more data on average.

Yet another embodiment is directed to a system that includes a memory, a processor core configured to issue an instruction targeting a location in the memory, and a cache hierarchy interposing the memory and the processor core. The cache hierarchy includes a first cache and a second cache that is a higher-level cache than the first cache, the first cache and second cache being coupled by a data bus. The first cache is configured to receive one or more data requests from a requesting device. The first cache is configured to transfer, in response to the one or more data requests, data of a first cache line to a second cache. The first cache is configured to interrupt the transfer of data of the first cache line by transferring a first portion of data of a second cache line to the second cache. The first cache is configured to transfer remaining data of the first cache line to the second cache. Thus, the embodiment increases the performance of a computing system by interleaving data from different cache lines when sending data to the data bus. In this way, data from the second cache line will reach the requestor sooner so that a core can begin using the data.

In some implementations, the first cache is configured to identify the second cache line as a speculative hit for a particular data request, where the first portion of data of the second cache line is transferred prior to receiving results of a cache directory lookup for the particular data request. The first cache is configured to discontinue the transfer of data of the second cache line in response to the results of the cache directory lookup indicating that the second cache line is a miss for the particular data request. In this way, performance of a computing system is increased by reclaiming bus bandwidth (e.g., data transfer cycles) to be used for speculative data transfers when those speculations are a cache line miss. Further, the data transfer cycles and power consumption penalties associated with cache misses can be reduced. The reclaimed cycles from the miss are used for a new speculative hit fetch, and in this way the data bus is used more efficiently and can send more data on average.

In some aspects, data of a third cache line is transferred instead of remaining data of the second cache line. In some implementations, the first cache is a set associative cache, and the second cache line is identified as a speculative hit based on a set address associated with the data request. In some examples, the first cache line and the second cache line are both speculative hits for the particular data request.

Various aspects of the present disclosure are described by narrative text, flowcharts, block diagrams of computer systems and/or block diagrams of the machine logic. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
- receiving, by a first cache, one or more data requests from a requesting device;
- transferring, by the first cache in response to the one or more data requests, a portion of data of a first cache line to a second cache;
- interrupting transferring the portion of data of the first cache line by transferring a first portion of data of a second cache line to the second cache; and
- transferring, by the first cache, a remaining portion of data of the first cache line to the second cache.

2. The method of claim 1, wherein the first portion of the data of the second cache line is transferred while the remaining portion of data of the first cache line is staged for transfer.

3. The method of claim 1, wherein a cache line transfer is interrupted only once.

4. The method of claim 1, wherein the remaining portion of data of the second cache line is subsequently transferred.

5. The method of claim 4 further comprising:
- transferring, by the first cache to the second cache, a second portion of data of the second cache line;
- interrupting transferring the second portion of data of the second cache line by transferring a first portion of a third cache line to the second cache; and
- transferring, by the first cache, a remaining portion of data of the second cache line to the second cache.

6. The method of claim 1 further comprising:
- identifying the second cache line as a speculative hit for a particular data request, wherein the first portion of data of the second cache line is transferred prior to receiving results of a cache directory lookup for the particular data request; and discontinuing a transfer of data of the second cache line in response to the results of the cache directory lookup indicating that the second cache line is a miss for the particular data request.

7. The method of claim 6, wherein data of a third cache line is transferred instead of a remaining portion of data of the second cache line.

8. The method of claim 6, wherein the first cache is a set associative cache, and wherein the second cache line is identified as a speculative hit based on a set address associated with the particular data request.

9. The method of claim 6, wherein the first cache line and the second cache line are speculative hits for the particular data request.

10. The method of claim 1, wherein the first cache is a level 2 (L2) cache and the second cache is a level one (L1) cache.

11. An apparatus comprising:

a first cache configured to output data from a cache array to a data bus; and a cache controller configured to receive one or more data requests and control the first cache to:

transfer, from the first cache in response to the one or more data requests, a portion of data of a first cache line to a second cache;

interrupt transferring the portion of data of the first cache line by transferring a first portion of data of a second cache line to the second cache; and transfer, from the first cache to the second cache, a remaining portion of data of the first cache line.

12. The apparatus of claim 11 further comprising a cache directory describing contents of the first cache and configured to provide directory lookup results to the cache controller, wherein the cache controller is configured to:

identify the second cache line as a speculative hit for a particular data request, wherein the first portion of data of the second cache line is transferred prior to receiving results of a cache directory lookup for the particular data request; and discontinue a transfer of data of the second cache line in response to the results of the cache directory lookup indicating that the second cache line is a miss for the particular data request.

13. The apparatus of claim 12, wherein data of a third cache line is transferred instead of a remaining portion of data of the second cache line.

14. The apparatus of claim 12, wherein the first cache is a set associative cache, and wherein the second cache line is identified as a speculative hit based on a set address associated with the particular data request.

15. The apparatus of claim 12, wherein the first cache line and the second cache line are speculative hits for the particular data request.

16. A system comprising:

a memory;

a processor core configured to issue an instruction targeting a location in the memory; and a cache hierarchy interposing the memory and the processor core, the cache hierarchy including:

a first cache; and a second cache that is a higher-level cache than the first cache, the first cache and second cache being coupled by a data bus, wherein the first cache is configured to:

receive, by the first cache, one or more data requests from a requesting device;

transfer, by the first cache in response to the one or more data requests, a portion of data of a first cache line to a second cache;

interrupt transferring the portion of data of the first cache line by transferring a first portion of data of a second cache line to the second cache; and transfer, by the first cache, a remaining portion of data of the first cache line to the second cache.

17. The system of claim 16, wherein the first cache is configured to:

identify the second cache line as a speculative hit for a particular data request, wherein the first portion of data of the second cache line is transferred prior to receiving results of a cache directory lookup for the particular data request; and discontinue transferring a remaining portion of data of the second cache line in response to the results of the cache directory lookup indicating that the second cache line is a miss for the particular data request.

18. The system of claim 17, wherein data of a third cache line is transferred instead of remaining data of the second cache line.

19. The system of claim 17, wherein the first cache is a set associative cache, and wherein the second cache line is identified as a speculative hit based on a set address associated with the data request.

20. The system of claim 17, wherein the first cache line and the second cache line are speculative hits for the particular data request.

* * * * *